June 24, 1930.     J. F. O'CONNOR     1,765,877
CENTER BEARING
Original Filed June 25, 1923
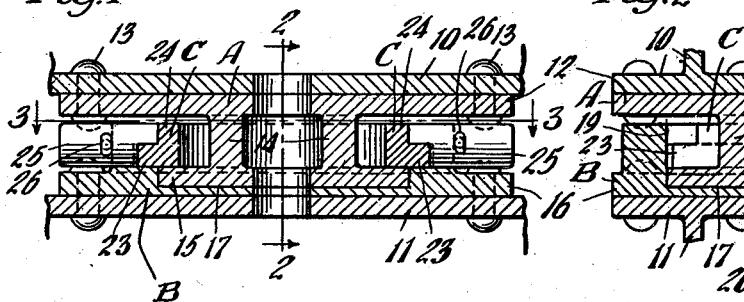
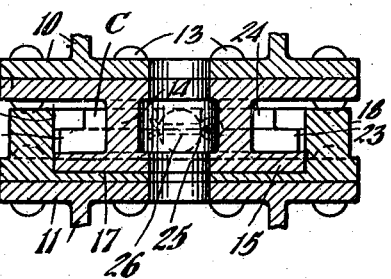
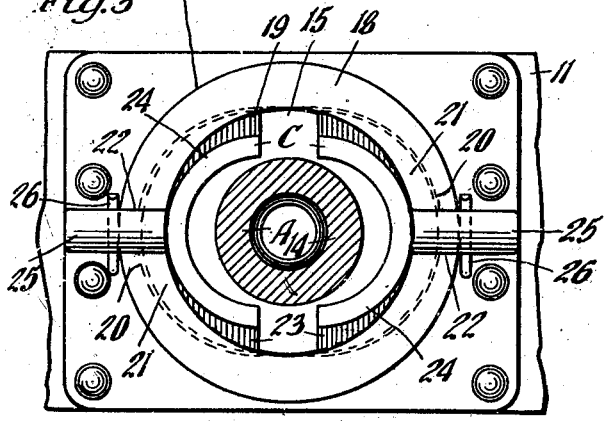
Witness
Wm. Geiger
Inventor
John F. O'Connor
By Joseph Harris
His Atty.

Patented June 24, 1930

1,765,877

UNITED STATES PATENT OFFICE

JOHN F. O'CONNOR, OF CHICAGO, ILLINOIS, ASSIGNOR TO W. H. MINER, INC., OF CHICAGO, ILLINOIS, A CORPORATION OF DELAWARE

CENTER BEARING

Original application filed June 25, 1923, Serial No. 647,436. Divided and this application filed June 18, 1928. Serial No. 286,171.

This invention relates to improvements in center bearings.

This application is a division of applicant's co-pending application, Serial No. 647,436, for Center bearings, filed June 25, 1923.

In the operation of railroads, it has been found advisable to connect the body and truck bolsters of a car so that the same cannot be separated vertically in case of collision or derailment, as this effectively prevents or minimizes the turning over or telescoping of the cars. It has been the usual practice to make use of a sectional pivot or king pin to lock the parts together, but much difficulty has been experienced in a great many instances in applying such a locking means, especially in the case of the six-wheel truck construction, and particularly dining, buffet and baggage cars, for the reason that the central axle of the six-wheel truck is located immediately below the pivotal center and it is impossible to obtain access from above the bolster through the car floor on account of the fixtures of the car being located directly over the bolsters.

Certain railroads also prefer using cast body bolsters having a continuous top web over the king pin opening, and therefore, in such cars having six-wheel trucks, it is impossible to insert or withdraw vertically the king pin or other type of locking device, unless the truck is completely dismantled for that purpose, which is prohibited from a practical standpoint.

One object of the invention is to provide a readily detachable locking connection for bolsters of an efficient type, comprising interengaging center bearing plates, thereby doing away entirely with the necessity of a locking king pin or other similar pivotal fastening device.

Another object of the invention is the provision of an improved center bearing for railroad cars, wherein the parts of the bearing permanently attached to the body and truck bolsters are effectively interlocked by simple and reliable locking means, including displaceable latching blocks, located entirely within the space between the bolsters and adapted to be applied by being inserted between the lower face of the body bolster and the upper face of the truck bolster, thereby particularly adapting the device to cars having a truck so constructed that access from above and below the bearing is practically impossible.

In the drawing, forming a part of this specification, Figure 1 is a vertical, sectional view through the center portion of the body and truck bolsters of a car, showing my improvements in connection therewith. Figure 2 is a vertical, transverse sectional view, corresponding substantially to the line 2—2 of Figure 1. And Figure 3 is a horizontal sectional view, corresponding substantially to the line 3—3 of Figure 1.

In said drawings, 10 denotes the lower portion of the body bolster and 11 the upper portion of the cooperating truck bolster.

The improved bolster connection, as shown, comprises an upper center bearing member A, a lower center bearing member B, and a pair of locking elements or blocks C.

The upper member A is provided with flanges 12 secured to the body bolster by rivets 13, or any other suitable fastening devices. The member A is provided with a downwardly projecting, hollow, cylindrical portion 14, having an annular, horizontally disposed flange 15 at the lower end thereof. The lower member B is also provided with flanges 16, similar to the flanges 12 secured to the truck bolster by rivets or any other suitable means. The upper surface of the member B is recessed, as indicated at 17, to receive the circular flange 15 of the member A, the recess 17 having a flat bottom and corresponding in depth to the thickness of the flange 15 so that the upper face of the flange will lie flush with the upper face of the member B and the lower surface of the cylindrical portion 14 of the member A will bear on the flat bottom of the recess or seat. The member B also has an upstanding circular flange 18 in spaced relation to the cylindrical portion 14 of the member A, thereby providing a circular opening 19. The flange 18 is cut out at opposite inner sides, providing arcuate recesses or pockets, as indicated at 20, and overhanging ledges 21. The flange 18 is slotted on diametrically opposite sides to provide radially disposed guideways 22 midway between the ends of the recesses 20.

The locking elements C are in the form of arcuate blocks being of like construction and each including a horizontally disposed flange 23, a semi-circular upstanding flange 24 at the inner edge and a radially extending, horizontally disposed, outwardly projecting, cylindrical arm 25, adapted to be received in the corresponding slot 22 in the flange 18 and to project beyond the latter. The locking elements are disposed at opposite sides of the cylindrical portion 14 of the member A, with the flanges 23 thereof received in the pockets 20 and the flanges 24 arranged in spaced relation to the portion 14, with the outer faces thereof adjacent the arms 25 retained in abutting relation with the inner face of the flange 18 by cotters 26 passing through the extremities of the arms 25 and abutting the outer side of the flange 18. Upon reference to Figures 1 and 3, it will be seen that when the blocks are in the position referred to, they engage the upper surface of the member B and overlap the flange 15 of the member A, holding the members A and B interlocked, upward movement of the blocks being prevented by the flanges 23 engaging the overhanging ledges 21 of the flange 18. Inward displacement of the blocks C is prevented by the cotter pins 26 extending through the outer ends of the arms 25. The blocks C are of such a width that they may be easily inserted from above into the recess 19.

The members A and B may be assembled and interlocked in the following manner:

With the flange 15 disposed above the upper edge of the flange 18, blocks C are placed upon the flange 15 in embracing relation and in contact with the cylindrical face of the projection 14 and with the arms 25 in vertical alignment with the respective openings or slots 22 of the flange 18. The member A is then lowered, together with the blocks, into the opening 19, the outer edge of the blocks clearing the inner edge of the flange 18 and the arms 25 entering the slots 22. When the parts have been thus assembled and the flange 15 is resting upon the member B, with the upper surface flush with the upper surface of the latter, the members A and B are interlocked by sliding the blocks C laterally outwardly to the position shown in Figure 3, the cotter pins 26 being inserted in the arms 25 to retain the blocks in position. In separating the members A and B, the reverse procedure takes place, as will be evident.

While I have herein shown and described what I consider the preferred manner of carrying out my invention, the same is merely illustrative and I contemplate all changes and modifications which come within the scope of the claims appended hereto.

I claim:

1. In car construction, the combination with body and truck bolsters; of a center bearing member fixed to one of said bolsters, said member being provided with a horizontally disposed annular bearing flange; a center bearing plate provided with a bearing socket accommodating said bearing flange fixed to the other bolster; fixed retaining means on said plate adjacent said socket having abutments thereon, said retaining means also having overhanging sections providing shoulders; locking blocks held against vertical displacement by said shoulders, and against separation by said abutments, said locking blocks overlapping the flange of the center bearing member to hold the same in the seat when engaged with said shoulders and abutments, said blocks being displaceable inwardly toward each other to disengage the same from said shoulders to unlock the bolsters from each other; and detachable retaining means for holding said blocks separated to an extent to engage said shoulders.

2. In car construction, the combination with body and truck bolsters; of a center bearing member secured to one of said bolsters, said member having a horizontal annular flange; a center bearing plate secured to the other bolster, said plate having a bearing seat accommodating said flange; locking slides; means for limiting separation of said slides, said means having shouldered engagement with said slides to prevent vertical displacement of the latter with respect to the corresponding bolster, said slides engaging said annular flange to lock the same within said seat when said slides are in separated condition; and retaining means for holding said slides so separated.

3. In an interlocked center bearing construction for body and truck bolsters of cars, the combination with a center bearing member adapted to be secured to one of said bolsters, said member having a projecting bearing portion provided with a horizontally disposed annular flange; of a center bearing plate provided with a seat accommodating said annular flange, said center bearing plate being adapted to be secured to the other bolster; said plate having an upstanding annular wall surrounding the seat and spaced therefrom, said wall being recessed at opposite sides to provide pockets having overhanging ledges; arcuate locking slides insertible between said projection and said annular wall, said locking slides, when in locking position, engaging over said annular flange to hold the same in the seat and having sections disposed within said pockets and held against vertical displacement by said overhanging ledges; and means for retaining said slides within said pockets.

In witness that I claim the foregoing I have hereunto subscribed my name this 15th day of June, 1928.

JOHN F. O'CONNOR.